United States Patent [19]

Janovski et al.

[11] Patent Number: 5,726,914
[45] Date of Patent: Mar. 10, 1998

[54] COMPUTER IMPLEMENTED PROCESS AND COMPUTER ARCHITECTURE FOR PERFORMANCE ANALYSIS

[75] Inventors: Joseph Janovski, Cockeysville; Pamela Y. Offutt, Reisterstown, both of Md.; Bruce E. Manthey, Holliston, Mass.; Wayne L. Huff, Baldwin; Philip A. Biggs, Towson, both of Md.

[73] Assignee: GSE Systems, Inc., Columbia, Md.

[21] Appl. No.: 476,114

[22] Filed: Jun. 7, 1995

Related U.S. Application Data

[63] Continuation-in-part of Ser. No. 124,173, Sep. 1, 1993.
[51] Int. Cl.$^6$ ................................................. G06F 17/60
[52] U.S. Cl. ............... 364/552; 364/468.15; 364/468.18; 395/211
[58] Field of Search ............... 364/264.7, 552, 364/152, 551.01, 269.4, 474.16, 554, 148, 188, 468.15, 468.18, 920; 395/650, 208, 209, 211, 925, 926

[56] References Cited

U.S. PATENT DOCUMENTS

| | | | |
|---|---|---|---|
| 3,593,008 | 7/1971 | DeWitt et al. | 235/151 |
| 4,392,119 | 7/1983 | Price et al. | 340/38 L |
| 4,701,849 | 10/1987 | Elden | 364/401 |
| 4,805,089 | 2/1989 | Lane et al. | 364/188 |
| 4,873,623 | 10/1989 | Lane et al. | 364/188 |
| 5,092,780 | 3/1992 | Vlach | 434/433 |
| 5,225,998 | 7/1993 | Singhal | 364/554 |
| 5,226,118 | 7/1993 | Baker et al. | 395/161 |
| 5,500,795 | 3/1996 | Powers et al. | 364/401 |
| 5,535,256 | 7/1996 | Maloney et al. | 379/34 |

OTHER PUBLICATIONS

Hayes, John P., Computer Architecture and Organization 1988, pp. 2–3, 40, and 644–646.
New Communications Technology Always Wins the Business; Communications News; Juan Sistachs, Nov. 1991, p. 62.
Pascal with Applications in Science & Engineering; Susan Finger and Ellen Finger, 1986, pp. 154–166; and 194–209.

*Primary Examiner*—Emanuel T. Voeltz
*Assistant Examiner*—TOny M. Cole
*Attorney, Agent, or Firm*—Lowe, Price, LeBlanc & Becker

[57] ABSTRACT

An apparatus and method for performance analysis, includes storing configuration table data in a configuration table and identifying a computer process in a library in accordance with the stored data. The computer process and the table data are configured and transmitted to a data gathering circuit in order to collect data, which is transmitted to a visual circuit for display.

54 Claims, 9 Drawing Sheets

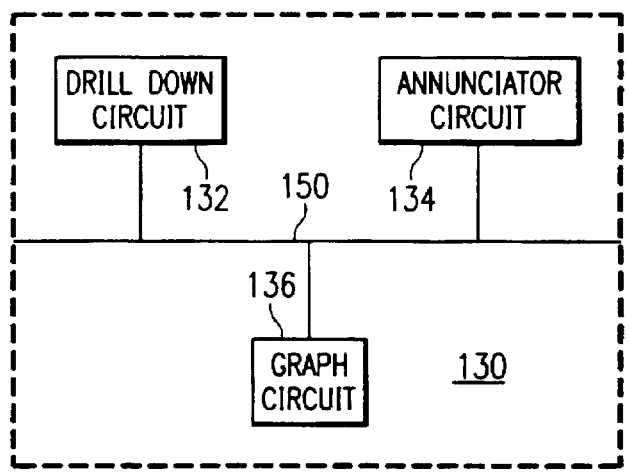
FIG. 4
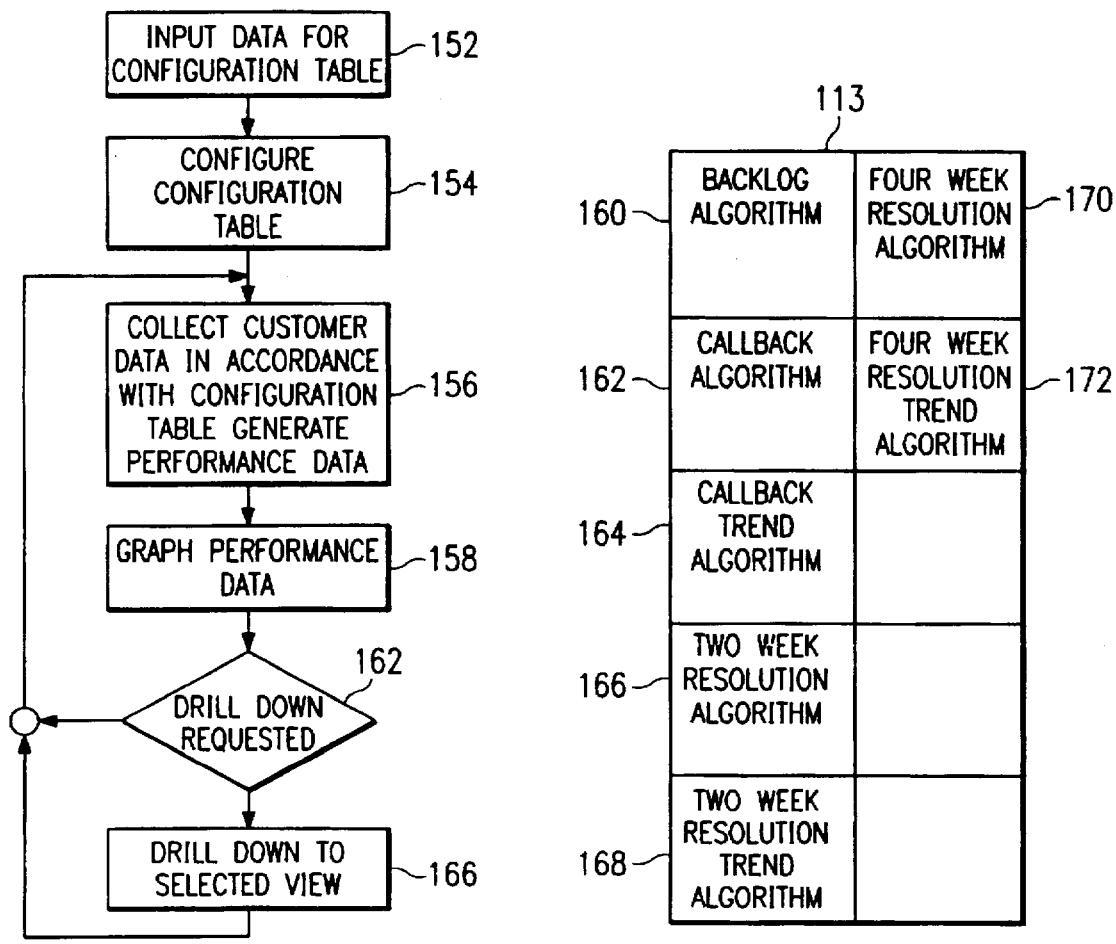
FIG. 5
FIG. 6

FIG. 7

| Configure Edit View Commands Window Help | | | Configure Edit |
|---|---|---|---|
| CALLBACK | | | |
| R&D 15:23 Art Michaelson | | | CUSTOMER SATISFACTION METRICS |
| CIM 12:45 Art Michaelson | | | CALLBACK ← |
| D/3 11:56 Jackie Stafford | | | 2_WEEK RESOLUTION |
| D/3 10:45 Jackie Stafford | CIM 16:55 Art Michaelson | | CALLS BACKLOG |
| R&D 10:23 Jackie Stafford | R&D 15:56 Art Michaelson | R&D 11:56 Art Michaelson | CALLBACK TREND |
| D/3 9:59 Jackie Stafford | S/3 10:23 Art Michaelson | CIM 11:23 Art Michaelson | 2_WK RESOLUTION TREND |
| D/3 9:45 Jackie Stafford | D/3 9:57 Jackie Stafford | D/3 11:00 Art Michaelson | SPARE |
| D/3 9:00 Jackie Stafford | D/3 8:45 Jackie Stafford | S/3 10:29 Art Michaelson | SPARE |
| | | D/3 10:25 Art Michaelson | SPARE |
| | | S/3 9:54 Art Michaelson | SPARE |
| 6/1/93 | 6/2/93 | 6/3/93 | RETURN TO TOP_LEVEL METRICS |

226, 224, 222

5,726,914

COMPUTER IMPLEMENTED PROCESS AND COMPUTER ARCHITECTURE FOR PERFORMANCE ANALYSIS

This is a Continuation-in-Part of U.S. Ser. No. 08/124,173, filed Sep. 1, 1993.

TECHNICAL FIELD OF THE INVENTION

This invention relates to a computer implemented process and computer architecture for performance analysis.

BACKGROUND OF THE INVENTION

There has been a need for a method and apparatus for providing real time monitoring and analysis of performance indicators of an organization, for example cycle time, operational costs, quality, customer satisfaction, etc. such that a manager of a business or a manager of the organization is able to maintain control of that business or organization through the real time information, for example performance data by providing immediate steps or procedures in order to identify and correct any bottlenecks or problems with the business or organization. Thus, without this performance data, the manager or business personnel is denied the opportunity to make real time decisions, resulting in an inefficient business or organization as well as reduced customer satisfaction.

We have discovered that this performance data has never been supplied to decision making individuals in a manner that would effectively assist them in this real time decision making process. We have also discovered that this performance data can be used to permit some decisions to be implemented in an automated manner, and other decisions with interaction of a decision maker to further evaluate the performance data.

SUMMARY OF THE INVENTION

One advantage of the present invention is in producing real time performance data which will provide a decision maker with an effective tool for making decisions that will result in improved customer satisfaction and efficiency within an organization.

Another advantage of the invention is in improved response to customers in a timely and effective manner as a result of real time performance data.

Another advantage is in continuously monitoring performance metrics of business processes in order to improve customer satisfaction.

A further advantage is in determining, from a predetermined menu, performance data to be collected through configuration table data.

Another advantage of the present invention is in executing defined performance algorithms in accordance with real time performance data.

A further advantage is in developing a data gathering procedure from a library to collect the customer data.

A still further advantage of the invention is in collecting customer data in accordance with a prescribed data gathering procedure.

Another advantage is in categorizing the gathered customer data in accordance with predetermined status limits and goals defined by configuration table data.

Yet another advantage of the invention is in viewing categorized data in accordance with predetermined status limits and a goal, and providing an alarm when the data are not within the predetermined status limits.

The present invention is based, in part, on the realization that decision makers are not supplied with the appropriate information to properly base decisions thereon. In accordance with this identification, the present invention produces a sophisticated computer architecture and operation for providing a decision maker with the necessary information to make an appropriate decision. The present invention also provides the capability to use this information to automatically make decisions under predetermined criteria. For example, in simplistic terms, when information regarding a manufacturing process is retrieved and collected by the present invention, the decision maker will be able to more efficiently and effectively evaluate the performance level of the manufacturing process and make alterations or corrections that will enhance the manufacturing process. If some of the information indicates that a segment of the manufacturing process has failed, an alarm may be automatically generated to signal that the process should be terminated until such problem is corrected.

Accordingly, the present invention provides real time performance data to provide a decision maker with an efficient tool, leading to improved customer satisfaction and improved efficiency in responding to customer needs.

The present invention provides the performance data with the alarm in order to improve customer satisfaction by providing a user interface for interactive and dynamic visualization capabilities for monitoring the performance data.

The present invention thus, inter alia, provides a user with a predetermined menu in order to obtain the customer data to be collected;

selects a data gathering procedure from a library in accordance with the configuration table to control the data collection circuit;

collects the customer data in accordance with the data gathering procedure;

categorizes the customer data in accordance with the predetermined status limits and a goal defined by the configuration table; and produces a visual display to view the performance data in accordance with the predetermined status limits and the goal, providing an alarm for performance data that is not within predetermined status limits.

These and other features of the invention that will be apparent to those skilled in the art from the following detailed description of the invention, taken together with the accompanying drawings.

DESCRIPTION OF THE DRAWINGS

FIG. 4 is a block diagram of the visual circuit of the present invention;

FIG. 5 is a flow chart of the operation of the present invention;

FIG. 6 is a diagram of an exemplary library of the present invention;

FIGS. 7–11 depict displayed outputs of the present invention;

DETAILED DESCRIPTION OF THE INVENTION

Figure 1:
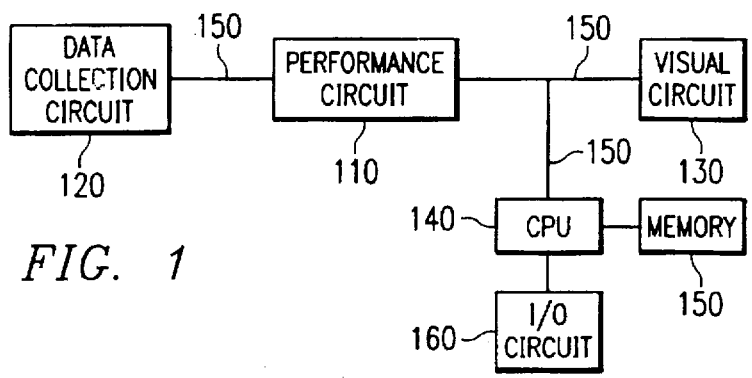
FIG. 1 is a high level block circuit diagram of the present invention.

Referring to FIG. 1, computer 140, for example, a TI 4000 Legacy computer, is connected to IO circuit 160 to display prompts, for example a menu in order to obtain configuration table data to be stored in the configuration table. The computer 140 is additionally coupled to memory 150 to store data, and the computer 140 is coupled to bus 150 for coupling to visual circuit 130, performance circuit 110 and data collection circuit 120.

The performance circuit 110 provides the prompts, which may be the menu (not shown) for the IO circuit 160 and stores a library of instructions, procedures or algorithms to control the data collection circuit 120 to obtain customer data. Thus, the library of computer instructions are specific steps to be performed by the data collection circuit 120 for collecting the data. The data collection circuit 120 receives the instructions, procedures or algorithm to collect the customer data and identifies a circuit of the data collection circuit 120 in order to actually collect or gather the customer data. The data collection circuit 120 collects the customer data and transforms the customer data into performance data to be viewed through the visual circuit 130, and the visual circuit 130 displays the collected performance data for example, by bar graphs so that a user may readily ascertain the performance of the organization of the user. The performance data may be displayed in any number of ways, for example by bar, Gantt, table, tree, image and network charts.

Each of the above circuits may be individual computer processors arranged as illustrated in a multiple-instruction multiple data multiprocessor format. Each of the various circuits described above include standard processors such as the 486 microprocessor manufactured by various computer manufacturers, including Intel corporation. Similar types of data processors that are capable of performing the functions described for each of the above individual components are also be used. Additional details relating to multiple instruction multiple data multi-processor types of computer architectures are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multi-Processor Systems, IEEE Computer, February 1995, pp. 26–34, all of which are incorporated herein by reference. Alternatively, each of the above circuits may also represent computer software subroutines in a large computer program providing a computer implemented performance analysis process in accordance with the present invention.

Figure 2:
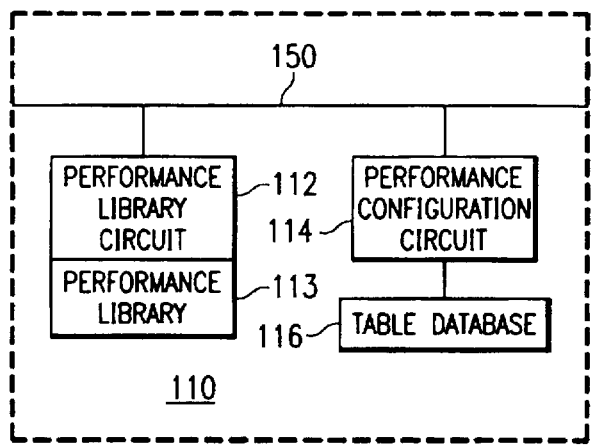
FIG. 2 is a block diagram of the performance circuit of the present invention.

Referring to FIG. 2, the performance circuit 110 includes a performance library circuit 112 to store computer instructions, procedures or algorithms in a performance library 113, performance configuration circuit 114 to configure the configuration table or a list of parameters used in conjunction with the instructions, procedures or algorithms to collect or gather the performance data and table database 116 to store the configuration table. After the instructions, procedures or algorithms have been configured, the instructions, procedures or algorithms are restored in the performance library.

The performance library circuit 112 and the performance configuration circuit 114 is coupled to bus 150, and the table database 116 is coupled to the performance configuration circuit 114. The performance configuration circuit 114 generates a series of prompts to be displayed on IO circuit 160. These prompts may be a menu in order that the user may input the configuration table data information. The prompts request the user to supply configuration table data for the configuration table to be stored in table database 116. The user inputs the configuration table data for the configuration table into the IO device 160, and the configuration table data for the configuration table is received by the performance configuration circuit 114. Each of the various circuits described above in FIG. 2 are standard processors such as the 486 microprocessor manufactured by various computer manufacturers, including Intel corporation. Similar types of data processors that are capable of performing the functions described for each of the above individual components may also be used. Alternatively, each of the above circuits may also represent computer software subroutines in a large computer program providing a computer implemented performance analysis process in accordance with the present invention.

Exemplary, Table 1 illustrates the configuration table data that may be stored in the configuration table. Table 1 may include other configuration table data to collect other types of data. The configuration table data includes an algorithm identification and performance indicator data including goal data, predetermined status limits and additional views that may be displayed to show additional performance data. The algorithm identification identifies a list of instructions, procedures or the algorithm to gather data and to transfer the customer data into performance data. The goal data is to indicate when the gathered data is unsatisfactory and an alarm condition exists. The predetermined status limits may be used by the algorithms and with the goal to determine differing levels of performance such as outstanding, acceptable, warning and alarm. While customer data has been used to illustrate the present invention, other types of data may be substituted for use by the present invention. The goal data and the predetermined status limits in combination with the algorithm transform the customer data into performance data. The configuration table data is stored in the table database 116 and is used to identify, for example an algorithm to gather customer data in performance library 113 so that when the algorithm is executed by the data collection circuit 120, the algorithm converts and categorizes the customer data into performance data through the goal data, and the predetermined status limits may determine if the organization is performing adequately. This performance data is transmitted to the visual circuit 130 to generate, for example bar graphs through data records representative of the customer data which has been collected and metric records representative of the predetermined status limits and goal data so the visual circuit 130 may display, for example if the customer data has exceeded predetermined performance limits or if the predetermined performance limits are close to being exceeded.

TABLE 1

| Algorithm Identification | Goal | Data | Predetermined Status Limits | Views Data |
|---|---|---|---|---|
| Backlog | Daily | 110 outstanding calls | 50%, 85%, 95% of goal | View 1, View 2 |
| Callback | 15 Minutes | 24 hours 100% | 25%, 100%, 100% | View 3, View 4 |
| Callback | Daily | 24 hours 100% | 25%, 100%, | View 5, |

TABLE 1-continued

| Algorithm Identification | Goal | Data | Predetermined Status Limits | Views Data |
|---|---|---|---|---|
| Trend | | | 100% | View 6 |
| 2-Week Resolution | 4 Hours | 2 weeks 100% | 25%, 100%, 100% | View 7, View 8 |
| 2-Week Resolution Trend | Daily | 2 weeks 100% | 25%, 100%, 100% | View 9, View 10 |
| 4-Week Resolution | 4 Hours | 4 weeks 100% | 25%, 100%, 100% | View 11, View 12 |
| 4-Week Resolution Trend | Daily | 4 weeks 100% | 25%, 100%, 100% | View 13, View 14 |

Table 1 shows that a plurality of algorithm identifications have been provided so that a plurality of algorithms are selected by the user to gather or collect the customer data. These algorithms include a backlog algorithm to provide performance data as to the number of telephone calls that have not yet been closed out, for example requiring warranty or technical support for the product. Additionally, the configuration table includes configuration table data to include goal data and predetermined status limits between acceptable performance and unacceptable performance. Corresponding to the backlog algorithm, the goal data or goal has been selected by the user to be 100% of the calls within a 24-hour time period and the predetermined status limits are selected to be 50%, 85%, 95% of the goal. Further, the predetermined status limit of 50% of the predetermined limit or goal may represent outstanding performance, between 50% and 85% of the predetermined status limits may represent satisfactory performance, between 85 and 95% of the predetermined status limits may represent a warning that the unsatisfactory performance is being approached and between 95 to 100% of the predetermined status limits may represent that an alarm or unsatisfactory performance has occurred. Further, the configuration table may include view data for additional views so that the user may obtain more customer data so that the user can understand why the unsatisfactory performance has occurred.

Table 1 shows, through the algorithm identification, that other algorithms that have been selected to collect or gather the customer data including callback to provide an indication if the caller has been called back, callback trend to provide trend information of callbacks, two-week resolution to indicate if the technical support has been provided within two weeks, two-week resolution trend to provide trend information of the two-week resolutions, four-week resolution to provide information or if technical support has been provided in four weeks and four-week resolution trend to provide information as to a trend of the four-week resolution.

FIG. 6 shows exemplary algorithms that correspond to the algorithm identifications of the configuration data table that may be stored in performance library 113. It should be understood that other types of algorithms may be stored in the performance library. The performance library includes backlog algorithm 160, callback algorithm 162, callback track algorithm 164, two-week resolution algorithm 166, two-week resolution trend algorithm 168, four-week resolution algorithm 170 and four-week resolution trend algorithm 172.

The performance library circuit 112 has previously stored these instructions, procedures or algorithms to gather the customer data by the data collection circuit 120 in the performance library 113. For example, one of the library algorithms is backlog algorithm 160. This backlog algorithm 160 from the performance library 113 includes the following instructions:

Query the database, for example database 127, for example a Service Information Management System (SIMS) in the customer service data collector circuit 122 for calls entered for each selected product line, for example, TAC, S/3, D/3, for the current week.

Query the database 127 for calls closed out, for example the technical support has been resolved for each selected product line during the current week.

Determine the total number of calls open, for example the technical support has not been resolved for each selected product line.

Determine the status data for the current week by product line and for all product lines by applying the goal to each call and the time since the call has been received.

Set the status data of a "Backlog" metric record to match the status data of the current week in accordance with the predetermined status limits and goal, as follows:

| Predetermined Status Limit × Goal | Status Data |
|---|---|
| 0–50% of goal: | Outstanding (GOLD) |
| 50–85% of goal: | Acceptable (GREEN) |
| 85–95% of goal: | Warning (YELLOW) |
| 95–% of goal: | Alarm (RED) |

Set the backlog data record to be the number of calls.

Output the Backlog data records to the visual circuit (130) (for example four records for each week). Output the Backlog metric data record to the visual circuit 130.

The backlog data records are transmitted to the visual circuit 130 so that the visual circuit 130 may display the data corresponding to the number of calls which are backlogged, for example by a bar graph. The backlog metric record includes the status data, for example data to display the bar graph in a color in accordance with the status data, for example gold if the status data is outstanding, green if the status data is acceptable, yellow if the status data is warning and red if the status data is alarm.

The callback algorithm 162 of the performance library includes the following instructions:

Query the database, for example the SIMS database, for all calls entered within predetermined time period, for example the last three working days.

Determine the Callback status of each call to be stored in the callback metric record as follows:

| Predetermined Status Limit × Response Period | Status Data |
|---|---|
| Callback within 0–25% of response period: | Outstanding (GOLD) |
| Callback within 25–100% of response period: | Acceptable (GREEN) |
| Late Callback > 100% of response period: | Alarm (RED) |

Determine the overall callback status to be stored in the "Callback" metric record to be transmitted to the visual circuit 130 as follows:

| Any call Alarm | Metric Problem |
|---|---|
| No Alarm calls, but 1 or more with Warning: | Metric Warning |
| All calls Acceptable status: | Metric OK |
| All calls OK or Outstanding: | Metric Outstanding |

The data gathering circuit 130 outputs the Callback data records to the visual circuit 130 to form the bar graph.

The data gathering circuit 130 outputs the Callback metric record to the visual circuit 130 to provide the performance data for the graph.

The callback trend algorithm 164 of the performance library 113 includes the following instructions:
- Query the database 113 for all calls entered on the previous working day.
- Determine the callback status for the callback status metric record for each product line, each response time window, and daily totals as follows:

| Any calls Alarm: | Problem Metric |
|---|---|
| All calls OK: | Metric Acceptable |
| Calls OK or Outstanding: | Outstanding |

- Delete oldest Callback Trend records, for example, only sixty records should exist in the database.

The data collection circuit 130 outputs the Callback Trend data records to the visual circuit 130. The data collection circuit 130 outputs the "Callback Trend" Metric records to the visual circuit.

The two-week resolution algorithm 166 of the performance library 113 includes the following instructions:
- Query the database 127 for all recent calls entered, for example during the last three weeks requesting Warranty and Support work.
- Determine the two-week resolution status of each call as follows:
- Calculate the percentage of calls resolved for a predetermined time period, for example each day; percentages are calculated for each product and for the day in total.

| Predetermined Status Limit × Calls Resolved | Status Data |
|---|---|
| Day 0–7: 0–60% of calls resolved, | status is Acceptable (GREEN) |
| Day 8–10: 0–40% of calls resolved, | status is Alarm (RED) |
| 40–55% of calls resolved, | status is Warning (YELLOW) |
| 55–65% of calls resolved, | status is Acceptable (GREEN) |
| 65–^% of calls resolved, | status is Outstanding (GOLD) |
| Day 11–15: 0–60% of calls resolved, | status is Alarm (RED) |
| 60–70% of calls resolved, | status is Acceptable (GREEN) |
| 70–100% of calls resolved, | status is Outstanding (GOLD) |

The status data is stored in the two-week resolution metric record and the metric record is transmitted to the visual circuit 130, the calls are stored in the two-week resolution data record, and the two-week resolution data record is transmitted to the visual circuit 100.

The two-week resolution trend algorithm 168 from the performance library 113 includes the following instructions.
- Delete the data from the database, for example the oldest day's calls, older than three weeks and one day.
- Calculate the percentage of calls entered within each relative week which were resolved within two weeks and set the weekly status for each product and in total as follows:

| Predetermined Status Limit | Status Data |
|---|---|
| 0–60%: | Alarm (RED) |
| 60–70%: | Acceptable (GREEN) |
| 70–100%: | Outstanding (GOLD) |

Determine the status of the "Two-Week Resolution Trend" Metric record as follows:

| Any week with alarm: | Metric Problem |
|---|---|
| All weeks acceptable: | Metric OK |
| All weeks OK with some Outstanding: | Metric Outstanding |

Output the Two-Week Resolution Trend data records for each product line and in total to visual circuit 130. Output the "Two-Week Resolution Trend" Metric record to visual circuit 130.

The Four-Week Resolution algorithm 170 from the performance library 113 includes the following instructions:
- Query the database 127 for all Billable calls entered during the last five weeks.
- Determine the daily resolution status of each call as follows:

| Predetermined Status Limit | Status Data |
|---|---|
| Day 1–12: 0–60% of calls resolved, | status is Acceptable (GREEN) |
| Day 13–16: 0–40% of calls resolved, | status is Alarm (RED) |
| 40–55% of calls resolved, | status is Warning (YELLOW) |
| 55–65% of calls resolved, | status is Acceptable (GREEN) |
| 65–100% of calls resolved, | status is Outstanding (GOLD) |
| Day 17–20: 0–60% of calls resolved, | status is Alarm (RED) |
| 60–70% of calls resolved, | status is Acceptable (GREEN) |
| 70–100% of calls resolved, | status is Outstanding (GOLD) |

Store the status data in the four-week resolution metric record.

Calculate the percentage of calls resolved for each day; percentages are needed for each product and for the day in total and store the daily percentage of calls in the data record.

Assign daily resolution statuses of the "Four-Week Resolution" Metric as follows:

| Any daily status Alarm: | Metric Problem |
|---|---|
| No daily Alarm but Warnings: | Metric Warning |
| All daily Acceptable: | Metric Acceptable |
| All Acceptable with some Outstanding: | Metric Outstanding |

Output the Four-Week Resolution records to the visual circuit 130. Output the "Four-Week Resolution" Metric.

The Four-Week Resolution trend algorithm 170 from the performance library 113 includes the following instructions:
- Query the database 127 for all calls entered, for example five-week plus one day earlier than the current date.
- Delete the old data, for example from the oldest day's calls prior to five weeks and one day.
- Calculate the percentage of calls entered within each respective week which were resolved, for example within four weeks and set the weekly status for each product and in total as follows:

| Predetermined Status Limit | Status Data |
|---|---|
| 0–60%: | Alarm (RED) |
| 60–70%: | Acceptable (GREEN) |
| 70–100%: | Outstanding (GOLD) |

Determine the status of the "Four-Week Resolution Trend" Metric as follows:

| | |
|---|---|
| Any Alarm Week: | Metric Problem |
| All weeks OK: | Metric Acceptable |
| All weeks OK with some Outstanding: | Metric Outstanding |

Output the Four-Week Resolution Trend records for each product line and in total to the visual circuit 130. Output the "Four-Week Resolution Trend" Metric record to the visual circuit 130.

After the configuration table has been completed by the user, the performance circuit 110 identifies a desired algorithm from the configuration table exemplary, by the algorithm identification which has been stored within the configuration table. The performance configuration circuit configures or combines the configured performance indication data with the algorithm to obtain executable instructions. These instructions, procedures and algorithm after configuration are restored within the performance library 113. The performance circuit 110, for example through the algorithm identification backlog, retrieves the backlog algorithm 160 from the performance library 113 through the performance library circuit 112 transmits the configured instructions corresponding to the backlog algorithm 160 to the data collection circuit 120 by using passageway pipes or SQL calls.

The data collection circuit 120 receives the instructions and configuration data from the table database 116 to a selected data gathering circuit, for example customer service data collector 122 coupled to database 127. The data collection circuit 120 executes the backlog algorithm 160 and the configuration data which has been transmitted by the performance circuit 110 to obtain the performance data to be displayed. The customer service data collector circuit 122 may collect information about calls made by the customers and calls returned to the customer in accordance with the backlog algorithm 160 from the performance library 113 and configuration data from the table database 116. Although not shown, the customer service data collector circuit 122 could be coupled to another computer, for example a mainframe computer, a distributed system, a minicomputer or microcomputer in order to supply the necessary data. The customer service data collector circuit 122 receives the configured instructions and data and executes the instruction in accordance with the configuration data to obtain the above-described data and metric records to be transmitted to the visual circuit 130.

Figure 3:
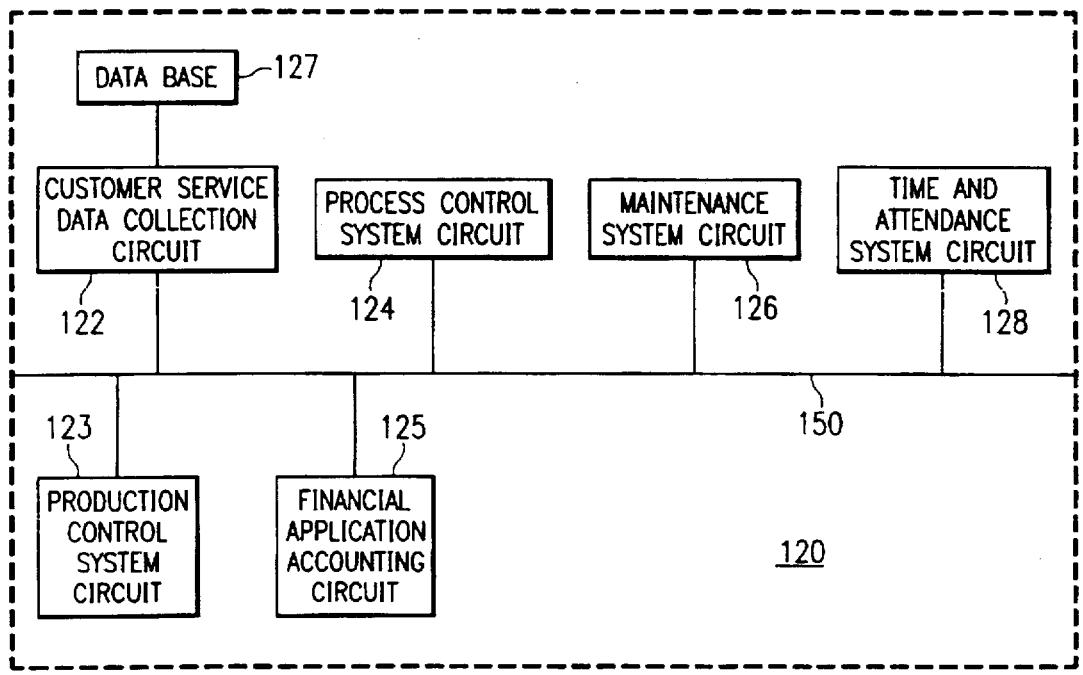
FIG. 3 is a block diagram of the data collection circuit of the present invention.

FIG. 3 illustrates further data collection circuits which may be coupled to other computers as with the circuit 122 to collect and store further types of data. Exemplary, process control systems circuit 124 collects customer data corresponding with a process being performed in a circuit factory. Maintenance systems circuit 126 collects customer data corresponding to maintenance of a system; time and attendance system circuit 128 collects customer data corresponding to an organizational system, namely time and attendance data. The production control system circuit 123 collects customer data corresponding to the production of a factory. The financial application accounting circuit 125 collects customer data such as accounting data. Other types of data gathering circuits could be employed by the present invention. The circuits (123, 124, 125, 126, 128) all may execute the algorithm in accordance with the configuration data as described with circuit 122. The graph records and metric records are transmitted along bus 150 to the visual circuit 130 after the data collection circuit 120 has collected the data.

Figure 12:
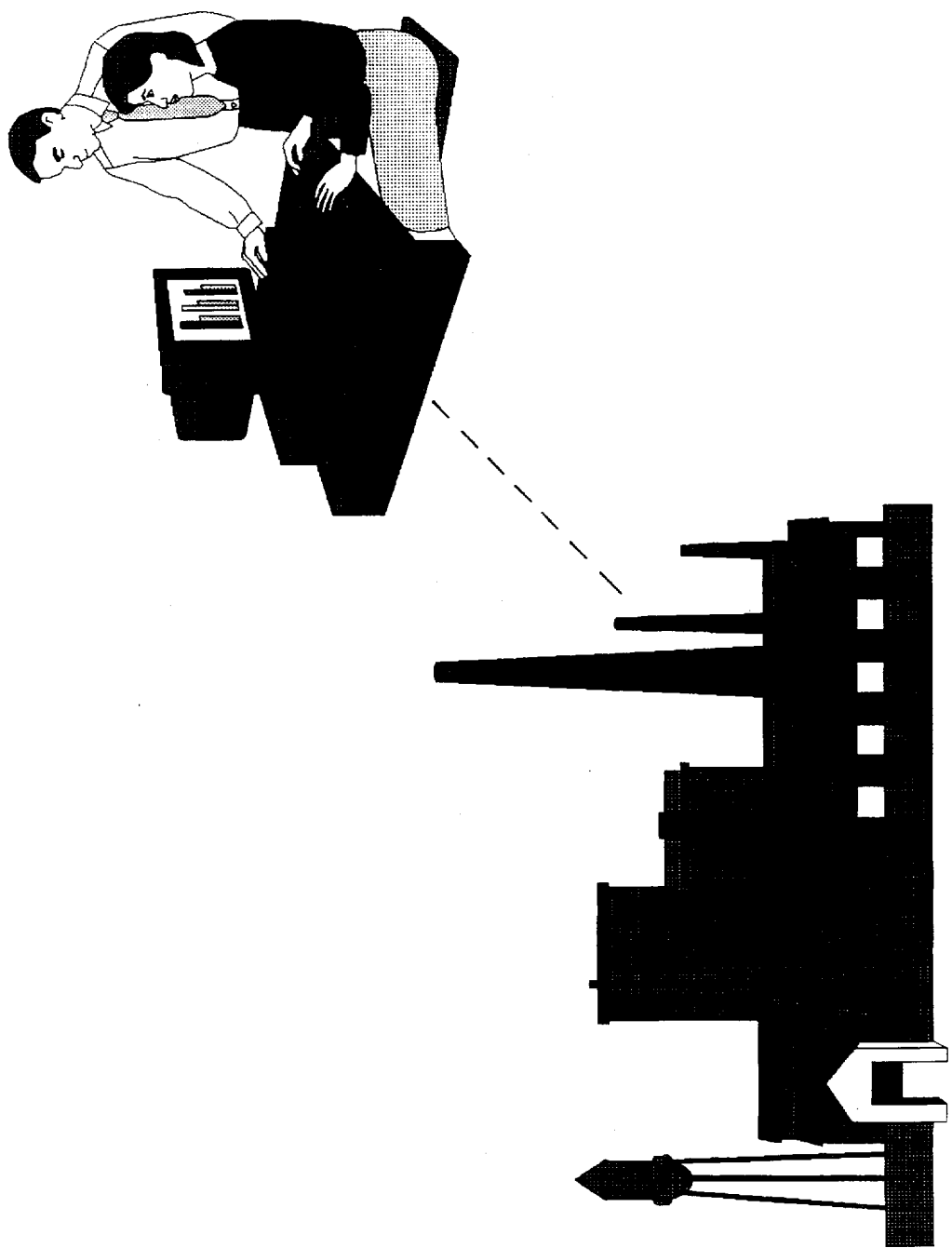
FIG. 12 is a diagrammatic view of one embodiment of the computer implemented performance analysis process of the present invention.

FIG. 12 is a diagrammatic view of one embodiment of the computer implemented performance analysis process of the present invention. As illustrated in FIG. 12, the computer implemented performance analysis process is implemented on a personal computer that directly, or indirectly via an operator, controls the factory process performed by the factory also illustrated in FIG. 12. The computer implemented process may be used to control a factory maintenance responsive to the performance data. The computer implemented process may also be used to control an early factory maintenance responsive to the performance data indicating a requirement for the early maintenance. The computer implemented process may also be used to control the generation of an alarm indicating that the factory process is not performing according to desired specifications responsive to the performance data. The computer implemented process may also be used to control the generation of an alarm indicating that factory personnel are not performing according to predetermined time and attendance requirements responsive to the performance data by monitoring factory personnel performance. In one embodiment, the alarm comprises a combination of visual and audible alarms. The computer implemented process may also be used to control other processes using the performance generated thereby.

Figure 13:
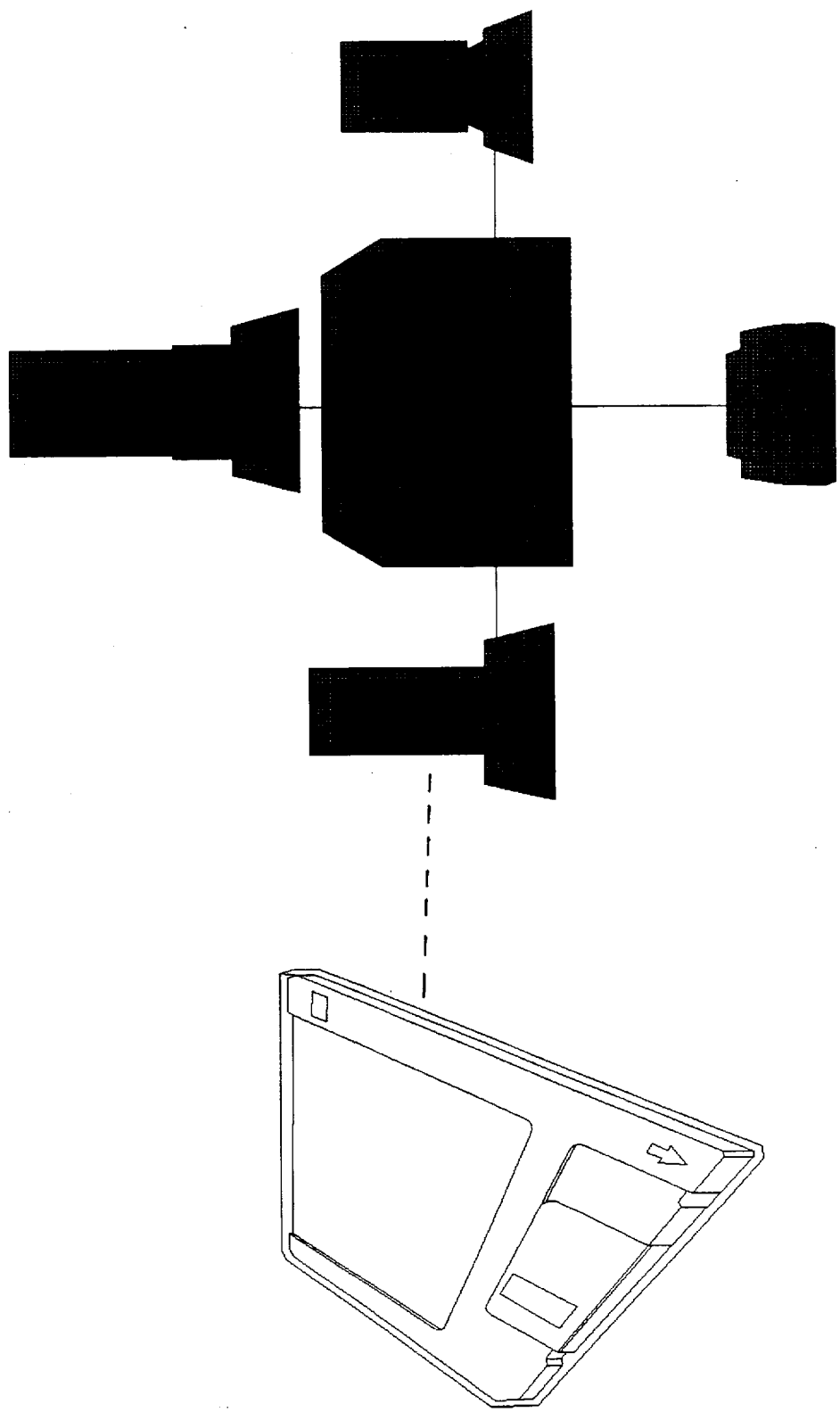
FIG. 13 is a diagrammatic view of one embodiment of the computer implemented performance analysis process as embodied on the floppy diskette tangible medium of the present invention.

FIG. 13 is a diagrammatic view of one embodiment of the computer implemented performance analysis process as embodied on the floppy diskette tangible medium of the present invention. As illustrated in FIG. 13, the computer implemented process instructing the computer to perform the performance analysis process described above is stored on a floppy diskette tangible medium. Of course, other tangible mediums may also be used such as a read only memory, a random access memory, hard disk drive or other programmable and erasable memories.

FIG. 4 illustrates a display panel displaying a bar graph. The segments of the bar graph correspond to the data records, while the particular color of the bar graph corresponds to the metric record transmitted from the circuit 122. For example, the bar graphs could be in the color red, indicating the alarm status, in the color yellow indicating a warning status, in the color green indicating an acceptable status and in the color gold indicating an outstanding status.

In FIG. 4, graph circuit 136 receives the data records and converts the data records into a bar graph on IO device 160. The annunciator circuit 134 receives the metric records and converts the bar graph corresponding to the associated data review to a color indicative of the status. As a result of the bar graphs and the different colors, the user is able to quickly determine performance information that has been displayed. Furthermore, the drill down circuit 132 drills down on the bar graph or the segment of the bar graph selected, for example through a mouse or light pen of a personal computer to display more detailed information, for example more detailed customer information through another view that has been selected so that the user can obtain this more detailed information to determine the cause of the color being displayed.

In FIG. 7, a bar graph is illustrated with each bar comprising segments 222, 224 and 226. The segment 222 indicates the date that the call was received and the segments 224 and 226 each include the person assigned to the call, the time the call was received and the product group for the group assigned to the call. The segments 224 and 226 are color coded in accordance with the status information from the annunciator circuit 134. For example, segment 224 could be selected to display through a pop-up window the caller ID, customer, call date, call time, response date, response time, response call, status, coverage, product group and technical representative. Furthermore, instead of the bar graph being displayed by date, it could be displayed by status, product or technical representative. If insufficient room exists to display all the information, additional information can be displayed by stacking the displays.

Figure 8:
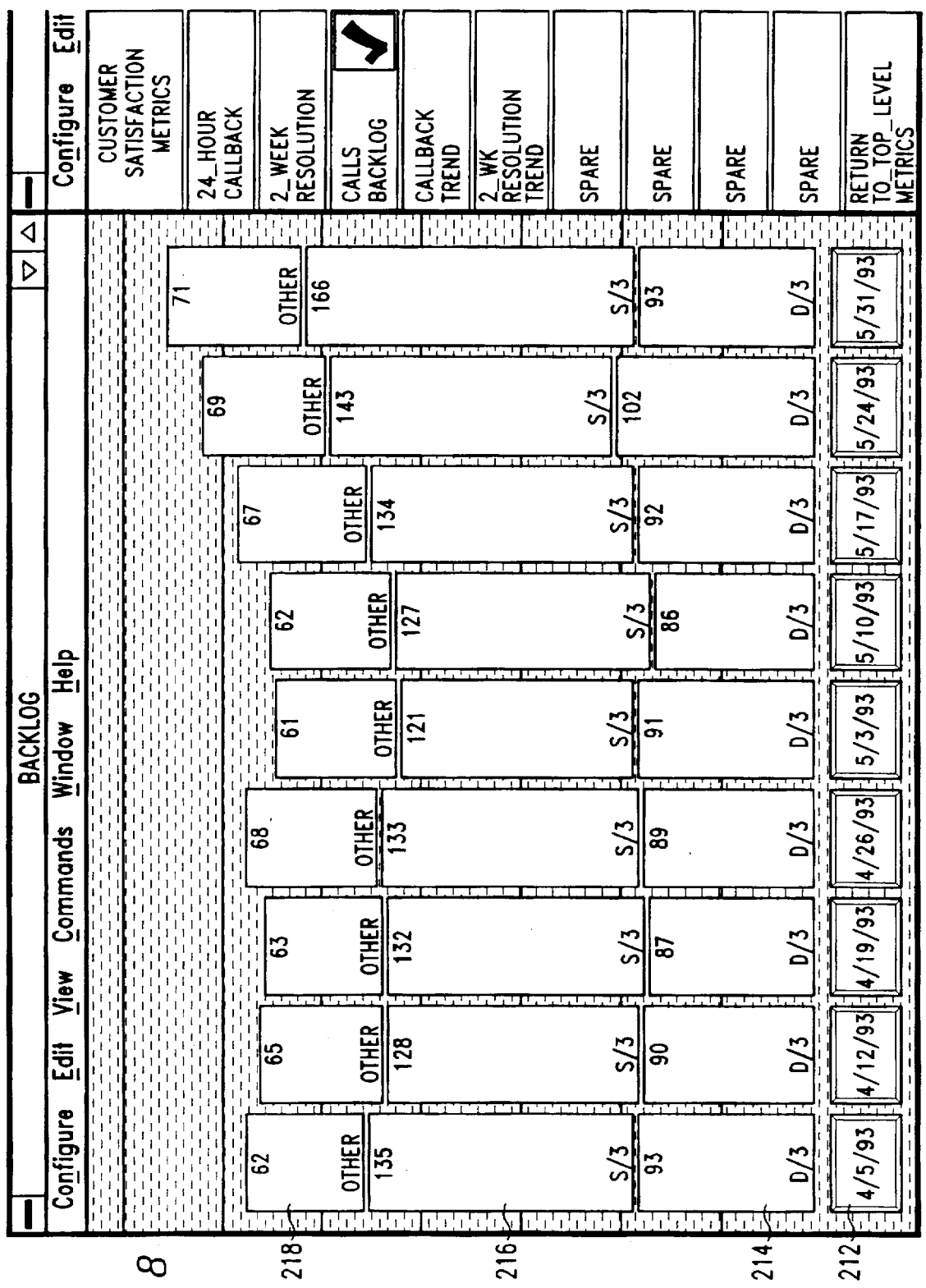

FIG. 8 illustrates a bar graph that displays segments (212, 214, 216 and 218). Segment 212 indicates the data of segments 214, 216 and 218. Segment 214 displays the number of calls for product D/3. Segment 216 displays calls for product S/3, while segment 218 displays the calls for the remaining products.

Figure 9:
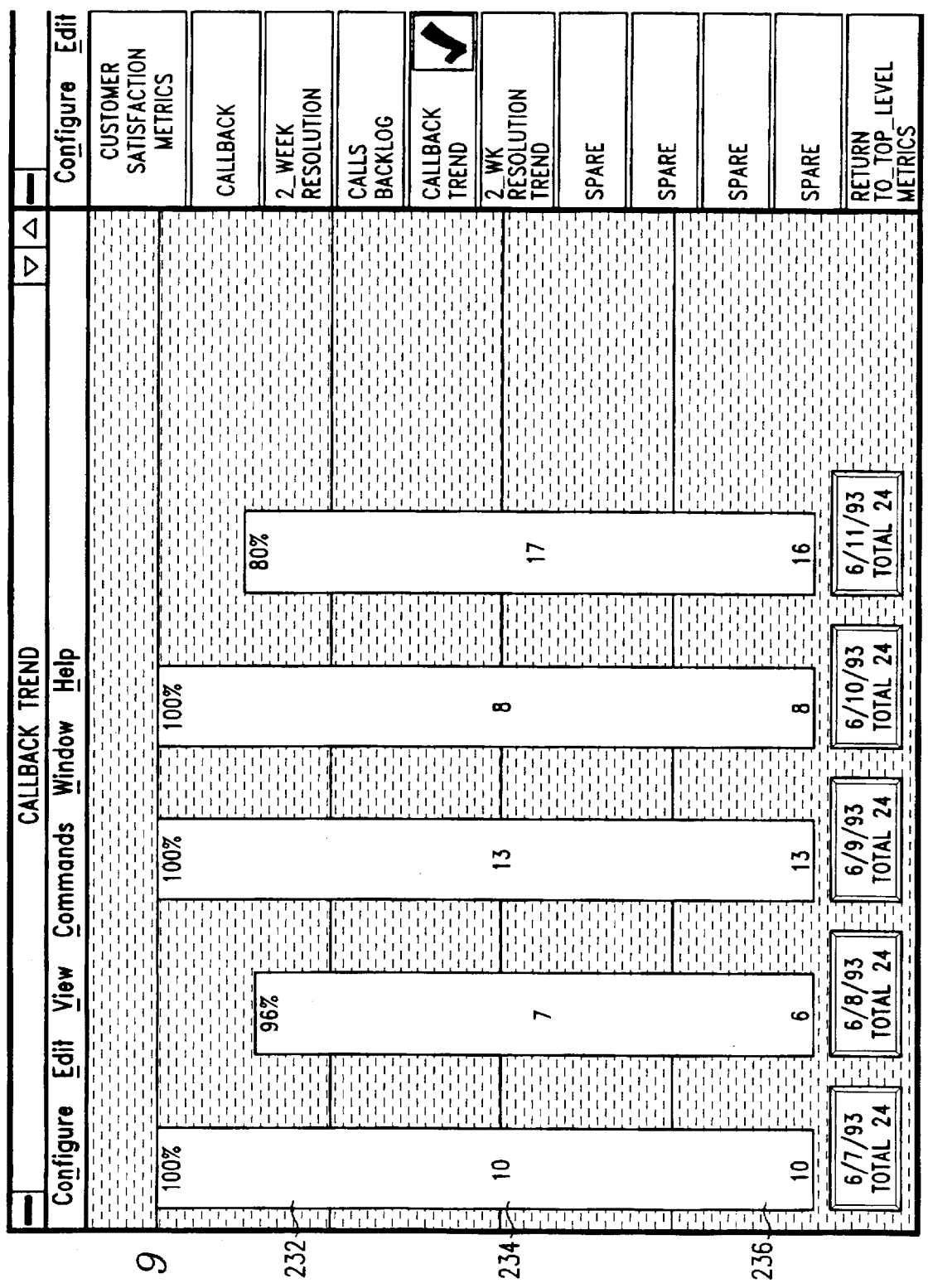

As illustrated in FIG. 9, a display illustrates bar graphs, each bar graph includes the percent of calls returned 232 at the top of the bar, the number of calls received 234 by the organization in the middle of the bar and the number of calls returned 236 by the organization at the bottom of the bar.

Figure 10:
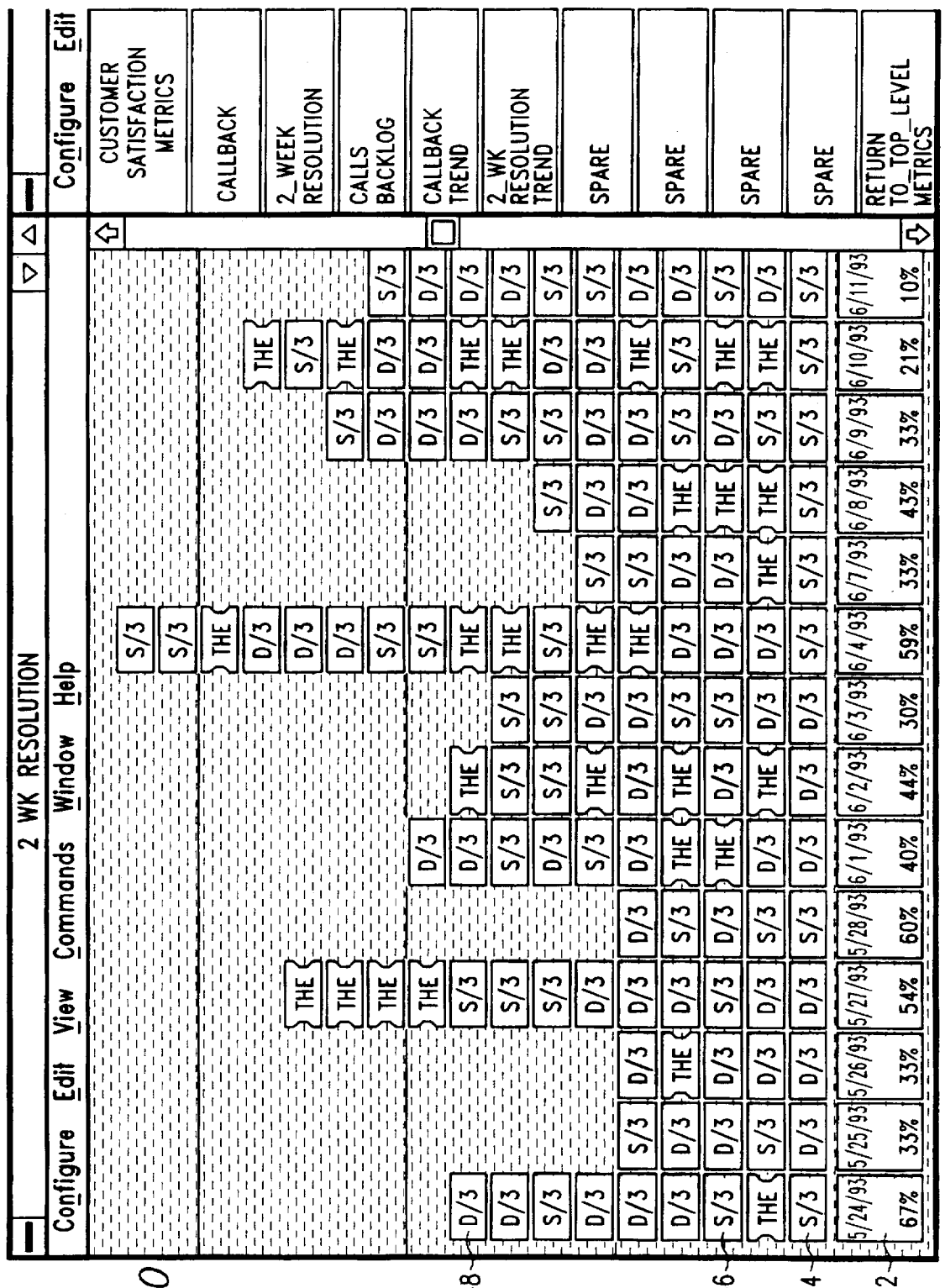
Figure 11:
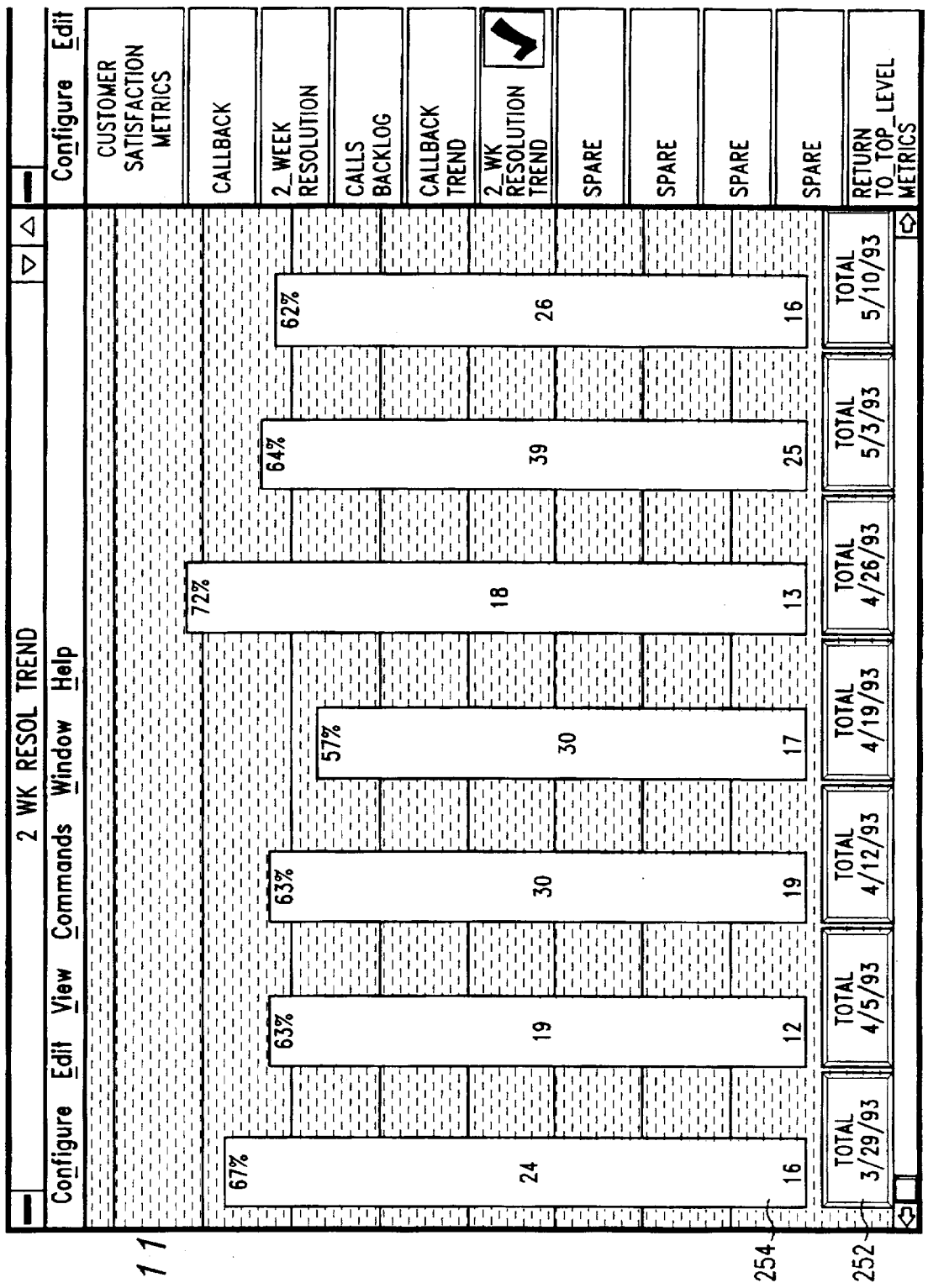

FIG. 10 illustrates a display for two-week resolution. The individual bars of the bar graph include segments 240, 244, 246 and 248. The segment 242 displays the date the call was received, the segments 242, 244, 246 and 248 indicate the individual calls that were received on that date, and the color of each segment 244, 246 and 248 correspond to the status corresponding to that call which has been provided by the annunciator circuit. For each call, the drill down circuit 132 drills down and displays the caller id, call date, description, date resolved, hours spent, coverage, product division, S/W version the technician and the customer. The above bar graph could be organized to display only the particular product line. FIG. 11 illustrates a display of two-week resolution trend data. The segment 252 illustrates the date while the segment 254 illustrates the number of calls not being resolved within three weeks. The bars are color coded by the annunciator circuit to indicate the status of the resolution for these calls. The segment includes at the top of the bar the percentage of calls resolved within two weeks, at the middle of the bar the number of calls during the week, and at the bottom of the bar the total number of calls resolved. Although not shown, the Four-Week Resolution and Four-Week Resolution Trend is similar to the Two-Week Resolution and Two-Week Resolution Trend but is for a longer time period, namely four weeks.

The operation of the present invention is illustrated in FIG. 5, block 152 illustrates that the performance circuit 110 obtains through a prompt the configuration table data to be stored in table database 116. Next, as illustrated in block 154, the performance configuration circuit 114 configures the configuration table data of the configuration table in accordance with an algorithm from the performance library 113 so that customer data may be gathered or collected by data collection circuit 120. The data collection circuit 120 receives the algorithm and collects the customer data in accordance with the algorithm and the configuration data to generate the performance data.

Block 158 graphs the performance data. At decision block 162, if additional data is requested, drill down is executed to view the additional data. Next, control is returned to block 156 to collect the next set of customer data.

Although the present invention and its advantages have been described in detail, it should be understood that various changes, substitutions and alterations can be made herein without departing from the spirit and scope of the invention as defined by the appended claims.

What is claimed is:

1. A computer system for performance analysis, the computer system comprising:

a computer, inputting configuration data, including computer process identification data and performance indication data corresponding to the computer process identification data, identifying a computer process from a library in accordance with the computer process identification data, configuring the computer process with the performance indication data to obtain a set of instructions to be executed to collect customer data, collecting the customer data and generating performance data in accordance with the instructions; and an output device responsively connected to said computer, and displaying the performance data for controlling a process responsive thereto with operator assistance, wherein the performance data indicates time and attendance of personnel, and wherein said computer controls generation of an alarm indicating that the personnel are not performing according to predetermined time and attendance requirements responsive to the performance data.

2. A computer system for performance analysis as in claim 1, wherein the alarm comprises a combination of visual and audible alarms.

3. A computer system for performance analysis as in claim 1, wherein said computer further generates performance indicators responsive to the performance indication data.

4. A computer system for performance analysis as in claim 1, wherein the library includes a plurality of individual computer implemented routines.

5. A computer system for performance analysis as in claim 1, wherein the computer process provides process steps to control a physical process.

6. A computer system for performance analysis as in claim 1, wherein said computer controls generation of another alarm indicating that the process is not performing according to desired specifications responsive to the performance data.

7. A computer system for performance analysis as in claim 1, wherein said output device comprises a display monitor.

8. A computer system for performance analysts as in claim 1, wherein said computer includes an input/output circuit;

a central processing unit receiving, from said input/output circuit, the configuration data;

a data bus connected to said central processing unit;

a library storage memory storing an algorithm corresponding to the identification data received from said data bus;

a performance library circuit coupled to said library storage memory via said data bus, identifying the algorithm from said library storage memory in accordance with the compute process identification data;

a table database storing a set of instructions;

a configuration circuit coupled to said performance library circuit via said data bus and coupled to said table database, receiving the algorithm identified by said performance library circuit and configuring the algorithm with the performance indication data to obtain the set of instructions to be executed to collect customer data, and storing the set of instructions in said table database;

a data collection circuit coupled to said configuration circuit via said data bus, collecting the customer data and generating the performance data in accordance with the set of instructions received from said configuration circuit.

9. A computer system for performance analysis as in claim 1, wherein the computer process comprises at least one of a callback computer process, a callback track computer process, a two-week resolution computer process, a two-week resolution trend computer process, a four-week resolution computer process and a four-week resolution trend computer process.

10. A computer system for performance analysis, the computer system comprising:

first means for, inputting configuration data, including computer process identification data and performance indication data corresponding to the computer process identification data, identifying a computer process from a library in accordance with the computer process identification data, configuring the computer process with the performance indication data to obtain a set of instructions to be executed to collect customer data, collecting the customer data and generating performance data in accordance with the instructions; and second means for displaying the performance data for controlling a process responsive thereto with operator assistance, wherein the performance data indicates time and attendance of personnel, and wherein said first means controls generation of an alarm indicating that the personnel are not performing according to predetermined time and attendance requirements responsive to the performance data.

11. A computer system for performance analysis as in claim 10, wherein the alarm comprises a combination of visual and audible alarms.

12. A computer system for performance analysis as in claim 10, wherein said first means further generates performance indicators responsive to the performance indication data.

13. A computer system for performance analysis as in claim 10, wherein the library includes a plurality of individual computer implemented routines.

14. A computer system for performance analysis as in claim 10, wherein the computer process provides process steps to control a physical process.

15. A computer system for performance analysis as in claim 10, wherein said first means controls generation of another alarm indicating that the process is not performing according to desired specifications responsive to the performance data.

16. A computer system for performance analysis as in claim 10, wherein said second means comprises a display monitor.

17. A computer system for performance analysis as in claim 10, wherein said first means includes an input/output circuit;

a central processing unit receiving, from said input/output circuit, the configuration data;

a data bus connected to said central processing unit;

a library storage memory storing an algorithm corresponding to the identification data received from said data bus;

a performance library circuit coupled to said library storage memory via said data bus, identifying the algorithm from said library storage memory in accordance with the compute process identification data;

a table database storing a set of instructions;

a configuration circuit coupled to said performance library circuit via said data bus and coupled to said table database, receiving the algorithm identified by said performance library circuit and configuring the algorithm with the performance indication data to obtain the set of instructions to be executed to collect customer data, and storing the set of instructions in said table database;

a data collection circuit coupled to said configuration circuit via said data bus, collecting the customer data and generating the performance data in accordance with the set of instructions received from said configuration circuit.

18. A computer system for performance analysis as in claim 10, wherein the computer process comprises at least one of a callback computer process, a callback track computer process, a two-week resolution computer process, a two-week resolution trend computer process, a four-week resolution computer process and a four-week resolution trend computer process.

19. A tangible medium storing process instructions implemented by a computer for performance analysis, the instructions capable of execution by the computer, comprising:

inputting configuration data, including computer process identification data and performance indication data corresponding to the computer process identification data, identifying a computer process from a library in accordance with the computer process identification data, configuring the computer process with the performance indication data to obtain a set of instructions to be executed to collect customer data, collecting the customer data and generating performance data in accordance with the instructions; and displaying the performance data for controlling a process responsive thereto with operator assistance, wherein the performance data indicates time and attendance of personnel, and wherein said computer controls generation of an alarm indicating that the personnel are not performing according to predetermined time and attendance requirements responsive to the performance data.

20. A tangible medium for performance analysis as in claim 19, wherein the alarm comprises a combination of visual and audible alarms.

21. A tangible medium for performance analysis as in claim 19, wherein said computer further generates performance indicators responsive to the performance indication data.

22. A tangible medium for performance analysis as in claim 19, wherein the library includes a plurality of individual computer implemented routines.

23. A tangible medium for performance analysis as in claim 19, wherein the computer process provides process steps to control a physical process.

24. A tangible medium for performance analysis as in claim 19, wherein said computer controls generation of another alarm indicating that the process is not performing according to desired specifications responsive to the performance data.

25. A tangible medium for performance analysis as in claim 19, wherein said output device comprises a display monitor.

26. A tangible medium for performance analysis as in claim 19, wherein said computer includes an input/output circuit;

a central processing unit receiving, from said input/output circuit, the configuration data;

a data bus connected to said central processing unit;

a library storage memory storing an algorithm corresponding to the identification data received from said data bus;

a performance library circuit coupled to said library storage memory via said data bus, identifying the algorithm from said library storage memory in accordance with the compute process identification data;

a table database storing a set of instructions;

a configuration circuit coupled to said performance library circuit via said data bus and coupled to said table database, receiving the algorithm identified by said performance library circuit and configuring the algorithm with the performance indication data to obtain the set of instructions to be executed to collect customer data, and storing the set of instructions in said table database;

a data collection circuit coupled to said configuration circuit via said data bus, collecting the customer data and generating the performance data in accordance with the set of instructions received from said configuration circuit.

27. A tangible medium for performance analysis as in claim 19, wherein the computer process comprises at least one of a callback computer process, a callback track computer process, a two-week resolution computer process, a two-week resolution trend computer process, a four-week resolution computer process and a four-week resolution trend computer process.

28. A computer system for performance analysis, the computer system comprising:

a computer, inputting configuration data, including computer process identification data and performance indication data corresponding to the computer process identification data, identifying a computer process from a library in accordance with the computer process identification data, configuring the computer process with the performance indication data to obtain a set of instructions to be executed to collect customer data, collecting the customer data and generating performance data in accordance with the instructions; and an output device responsively connected to said computer, and displaying the performance data for controlling a process responsive thereto with operator assistance, wherein the computer process comprises at least one of a callback computer process, a callback track computer process, a two-week resolution computer process, a two-week resolution trend computer process, a four-week resolution computer process and a four-week resolution trend computer process.

29. A computer system for performance analysis as in claim 28, wherein the performance data indicates time and attendance of personnel, and wherein said computer controls generation of an alarm indicating that the personnel are not performing according to predetermined time and attendance requirements responsive to the performance data.

30. A computer system for performance analysis as in claim 29, wherein said computer controls generation of another alarm indicating that the process is not performing according to desired specifications responsive to the performance data.

31. A computer system for performance analysis as in claim 29, wherein the alarm comprises a combination of visual and audible alarms.

32. A computer system for performance analysis as in claim 28, wherein said computer further generates performance indicators responsive to the performance indication data.

33. A computer system for performance analysis as in claim 28, wherein the library includes a plurality of individual computer implemented routines.

34. A computer system for performance analysis as in claim 28, wherein the computer process provides process steps to control a physical process.

35. A computer system for performance analysis as in claim 28, wherein said output device comprises a display monitor.

36. A computer system for performance analysis as in claim 28, wherein said computer includes an input/output circuit;

a central processing unit receiving, from said input/output circuit, the configuration data;

a data bus connected to said central processing unit;

a library storage memory storing an algorithm corresponding to the identification data received from said data bus;

a performance library circuit coupled to said library storage memory via said data bus, identifying the algorithm from said library storage memory in accordance with the compute process identification data;

a table database storing a set of instructions;

a configuration circuit coupled to said performance library circuit via said data bus and coupled to said table database, receiving the algorithm identified by said performance library circuit and configuring the algorithm with the performance indication data to obtain the set of instructions to be executed to collect customer data, and storing the set of instructions in said table database;

a data collection circuit coupled to said configuration circuit via said data bus, collecting the customer data and generating the performance data in accordance with the set of instructions received from said configuration circuit.

37. A computer system for performance analysis, the computer system comprising:

first means for inputting configuration data, including computer process identification data and performance indication data corresponding to the computer process identification data, identifying a computer process from a library in accordance with the computer process identification data, configuring the computer process with the performance indication data to obtain a set of instructions to be executed to collect customer data, collecting the customer data and generating performance data in accordance with the instructions; and second means for displaying the performance data for controlling a process responsive thereto with operator assistance, wherein the computer process comprises at least one of a callback computer process, a callback track computer process, a two-week resolution computer process, a two-week resolution trend computer process, a four-week resolution computer process and a four-week resolution trend computer process.

38. A computer system for performance analysis as in claim 37, wherein the performance data indicates time and attendance of personnel, and wherein said first means controls generation of an alarm indicating that the personnel are not performing according to predetermined time and attendance requirements responsive to the performance data.

39. A computer system for performance analysis as in claim 38, wherein said first means controls generation of another alarm indicating that the process is not performing according to desired specifications responsive to the performance data.

40. A computer system for performance analysis as in claim 38, wherein the alarm comprises a combination of visual and audible alarms.

41. A computer system for performance analysis as in claim 37, wherein said first means further generates performance indicators responsive to the performance indication data.

42. A computer system for performance analysis as in claim 37, wherein the library includes a plurality of individual computer implemented routines.

43. A computer system for performance analysis as in claim 37, wherein the computer process provides process steps to control a physical process.

44. A computer system for performance analysis as in claim 37, wherein said second means comprises a display monitor.

45. A computer system for performance analysis as in claim 37, wherein said first means includes an input/output circuit;

a central processing unit receiving, from said input/output circuit, the configuration data;

a data bus connected to said central processing-unit;

a library storage memory storing an algorithm corresponding to the identification data received from said data bus;

a performance library circuit coupled to said library storage memory via said data bus, identifying the algorithm from said library storage memory in accordance with the compute process identification data;

a table database storing a set of instructions;

a configuration circuit coupled to said performance library circuit via said data bus and coupled to said table database, receiving the algorithm identified by said performance library circuit and configuring the algorithm with the performance indication data to obtain the set of instructions to be executed to collect customer data, and storing the set of instructions in said table database;

a data collection circuit coupled to said configuration circuit via said data bus, collecting the customer data and generating the performance data in accordance with the set of instructions received from said configuration circuit.

46. A tangible medium storing process instructions implemented by a computer for performance analysis, the instructions capable of execution by the computer, comprising:

inputting configuration data, including computer process identification data and performance indication data corresponding to the computer process identification data, identifying a computer process from a library in accordance with the computer process identification data, configuring the computer process with the performance indication data to obtain a set of instructions to be executed to collect customer data, collecting the customer data and generating performance data in accordance with the instructions; and displaying the performance data for controlling a process responsive thereto with operator assistance, wherein the computer process comprises at least one of a callback computer process, a callback track computer process, a two-week resolution computer process, a two-week resolution trend computer-process, a four-week resolution computer process and a four-week resolution trend computer process.

47. A tangible medium for performance analysis as in claim 46, wherein the performance data indicates time and attendance of personnel, and wherein said first means controls generation of an alarm indicating that the personnel are not performing according to predetermined time and attendance requirements responsive to the performance data.

48. A tangible medium for performance analysis as in claim 47, wherein the alarm comprises a combination of visual and audible alarms.

49. A tangible medium for performance analysis as in claim 47, wherein said computer controls generation of another alarm indicating that the process is not performing according to desired specifications responsive to the performance data.

50. A tangible medium for performance analysis as in claim 46, wherein said computer further generates performance indicators responsive to the performance indication data.

51. A tangible medium for performance analysis as in claim 46, wherein the library includes a plurality of individual computer implemented routines.

52. A tangible medium for performance analysis am in claim 46, wherein the computer process provides process steps to control a physical process.

53. A tangible medium for performance analysis as in claim 46, wherein said output device comprises a display monitor.

54. A tangible medium for performance analysis as in claim 46, wherein said computer includes an input/output circuit;

a central processing unit receiving, from said input/output circuit, the configuration data;

a data bus connected to said central processing unit;

a library storage memory storing an algorithm corresponding to the identification data received from said data bus;

a performance library circuit coupled to said library storage memory via said data bus, identifying the algorithm from said library storage memory in accordance with the compute process identification data;

a table database storing a set of instructions;

a configuration circuit coupled to said performance library circuit via said data bus and coupled to said table database, receiving the algorithm identified by said performance library circuit and configuring the algorithm with the performance indication data to obtain the set of instructions to be executed to collect customer data, and storing the set of instructions in said table database;

a data collection circuit coupled to said configuration circuit via said data bus, collecting the customer data and generating the performance data in accordance with the set of instructions received from said configuration circuit.

* * * * *

UNITED STATES PATENT AND TRADEMARK OFFICE
CERTIFICATE OF CORRECTION

PATENT NO. : 5,726,914
DATED : Mar. 10, 1998
INVENTOR(S) : Joseph Janovski, et al It is certified that error appears in the above-identified patent and that said Letters Patent is hereby corrected as shown below:

On title page,

Under the [56] References Cited, U.S. Patent Documents section of the printed patent, insert

| | | | |
|---|---|---|---|
| 4,967,381 | 10/30/90 | Lane et al. | 364/551.01 |
| 5,212,635 | 05/18/93 | Ferriter | 364/402 |
| 5,440,478 | 08/08/95 | Fisher et al. | 364/188 |
| 5,486,998 | 01/23/96 | Corso | 364/152 |

Signed and Sealed this

Twenty-ninth Day of December, 1998

Attest:

BRUCE LEHMAN

*Attesting Officer*  Commissioner of Patents and Trademarks